United States Patent Office 3,149,954
Patented Sept. 22, 1964

3,149,954
METHOD OF RETARDING THE GROWTH OF VEGETATION
James E. Harrod, Radnor Green, Claymont, Del., assignors to E. I. du Pont de Nemours and Company, Wilmington, Del., a corporation of Delaware
No Drawing. Filed Feb. 16, 1962, Ser. No. 173,807
1 Claim. (Cl. 71—2.5)

This invention relates to plant growth retardation and to grass growth retardation by chemical treatment.

The need for an effective chemical treatment for retardation of plants and especially grasses without undesirable effects has long been recognized. Such chemical treatment, for example, will eliminate or markedly reduce the number of mowings required to maintain turfs and lawns at desired height.

Compounds identified as 1-substituted-5-oxo-2-pyrrolidine acetic acids are known. See, for example, Jacobson U.S. Patent No. 2,496,163 issued January 31, 1950. This patent also teaches that related 1-unsubstituted compounds can be prepared using ammonia (column 5, line 28). Jacobson discloses as utility that these latter "2-substituted-5-oxopyrrolidines per se may be used as plant growth regulants." However, with respect to the 1-substituted-5-oxo-2-pyrrolidine acetic acid, Jacobson says only that they are useful as intermediates (column 7, line 15) and some are useful as surface-active agents (column 7, line 27).

It is well known that the expression "plant growth regulant activity" denotes to persons skilled in the art a particular plant growth effect characterized by a distortion of the normal pattern, expressing itself in such phenomena as the twisting and curling of plant stems. The best known example of a compound possessing plant growth regulant activity is 2,4-D which on application to broadleaves causes the familiar twisting and curling effects.

In the search for chemicals useful to retard plant growth and grass growth as described above, tests with the plant growth regulant 1-substituted-5-oxo-2-pyrrolidine acetic acids of the Jacobson patent are completely discouraging. It is apparent that the activity of these compounds is of the conventional hormonal type and does not extend to plant and grass retardation. For example, 5-oxo-2-pyrrolidine acetic acid itself, when tested for this latter utility gives negative results.

Similarly, retardation tests of the only Jacobson compound of this plant regulant class of 1-unsubstituted compounds, namely, 5-oxo-2-pyrrolidineacetamide (Example V of the Jacobson patent) likewise give negative results.

Even investigation of various compounds related to Jacobson's tends to indicate complete lack of worthwhile retardation utility. Illustrative of this is 1,1-ethylenebis-5-oxo-2-pyrrolidine actic acid, disclosed as a plant growth regulant in Evans U.S. Patent No. 2,578,526, issued December 11, 1951. This compound shows no retardation effects whatsoever in tests on a large representative number of plant and grass species.

Particularly in view of the state of the art, it is the surprising discovery of the present invention that a narrow class of chemical compounds are effective for plant and particularly grass retardation, without showing undesirable effects such as chlorosis or the familiar hormonal effects. These compounds also unexpectedly increase tillering or stooling of treated grasses, resulting in a fuller, thicker, more desirable growth. Thus, the use of these compounds very markedly reduces the number of mowings required to maintain turfs, lawns and road sides at desired height, while at the same time promoting the grass coverage of the ground.

The compounds within the scope of this invention are 1-substituted-5-oxo-2-pyrrolidine acetic acids, and their halides, salts, amides, hydrazides and esters. The substituent in the 1-position can be straight or branched chain or cyclic, and can be alkyl of 2 through 18 carbon atoms, cycloalkyl of 3 through 8 carbon atoms, alkenyl, alkynyl, hydroxyalkyl, alkoxyalkyl, cyanoalkyl, carboxyalkyl, carbalkoxyalkyl, each of these groups having 2 through 6 carbon atoms, or a phenyl, mono- or group has 1 or 2 carbon atoms, or mono- or di-substituted (on the phenyl ring) phenylalkyl wherein the alkyl group has 1 or 2 carbon atoms, and wherein the aforementioned substituents can be halogen including chlorine, bromine, fluorine and iodine, methyl, ethyl, isopropyl, methoxy, nitro, or combinations of these substituents.

As mentioned above, these compounds are generally known. They can be prepared by known procedures. For example, a primary aliphatic, cycloalkyl, aromatic or arylalkyl amine can be reacted with beta-hydromuconic acid, beta-bromoadipic acid or beta-chloroadipic acid according to techniques described in the literature. The acid halides can be prepared from the acids, and the amides, hydrazides, and substituted amides and substituted hydrazides can be prepared from the acid chlorides and ammonia or the appropriate amine or hyrdazine by known methods. The salts and esters can be formed by known methods for forming such derivatives from the acids.

Illustrative of compounds within the scope of this invention can be named the following:

(1) 1-cyclohexyl-5-oxo-2-pyrrolidine acetic acid
(2) 1-isopropyl-5-oxo-2-pyrrolidine acetic acid
(3) 1-(n-butyl)-5-oxo-2-pyrrolidine acetic acid
(4) 1-(t-butyl)-5-oxo-2-pyrrolidine acetic acid
(5) 1-(n-hexyl)-5-oxo-2-pyrrolidine acetic acid
(6) 1-phenyl-5-oxo-2-pyrrolidine acetic acid
(7) 1-(p-chlorophenyl)-5-oxo-2-pyrrolidine acetic acid
(8) 1-(m-chlorophenyl)-5-oxo-2-pyrrolidine acetic acid
(9) 1-(3,4-dichlorophenyl)-5-oxo-2-pyrrolidine acetic acid
(10) 1-(o-chlorophenyl)-5-oxo-2-pyrrolidine acetic acid
(11) 1-(m-bromophenyl)-5-oxo-2-pyrrolidine acetic acid
(12) 1-(p-iodophenyl)-5-oxo-2-pyrrolidine acetic acid
(13) 1-(m-fluorophenyl)-5-oxo-2-pyrrolidine acetic acid
(14) 1-(p-tolyl)-5-oxo-2-pyrrolidine acetic acid
(15) 1-(p-methoxyphenyl)-5-oxo-2-pyrrolidine acetic acid
(16) 1-(m-nitrophenyl)-5-oxo-2-pyrrolidine acetic acid
(17) 1-(2,5-dimethoxyphenyl)-5-oxo-2-pyrrolidine acetic acid
(18) 1-(3-methoxy-4-chlorophenyl)-5-oxo-2-pyrrolidine acetic acid
(19) 1-(3-bromo-4-methylphenyl)-5-oxo-2-pyrrolidine acetic acid
(20) 1-(3-nitro-4-chlorophenyl)-5-oxo-2-pyrrolidine acetic acid
(21) 1-(3,4-dimethylphenyl)-5-oxo-2-pyrrolidine acetic acid
(22) 1-allyl-5-oxo-2-pyrrolidine acetic acid, sodium salt
(23) 1-(n-butyl-5-oxo-2-pyrrolidine acetic acid, sodium salt
(24) 1-(3,4-dichlorophenyl)-5-oxo-2-pyrrolidine acetic acid, potassium salt
(25) 1-(p-tolyl)-5-oxo-2-pyrrolidine acetic acid, lithium salt
(26) 1-phenyl-5-oxo-2-pyrrolidine acetic acid, sodium salt
(27) 1-ethyl-5-oxo-2-pyrrolidine acetic acid, potassium salt
(28) 1-(n-propyl)-5-oxo-2-pyrrolidine acetic acid, magnesium salt
(29) 1-(sec-butyl)-5-oxo-2-pyrrolidine acetic acid, barium salt

(30) 1-isobutyl-5-oxo-2-pyrrolidine acetic acid, calcium salt
(31) 1-(t-butyl)-5-oxo-2-pyrrolidine acetic acid, strontium salt
(32) 1-cyclohexyl-5-oxo-2-pyrrolidine acetic acid, ammonium salt
(33) 1-(n-butyl)-5-oxo-2-pyrrolidine acetic acid, methylamine salt
(34) 1-(n-hexyl)-5-oxo-2-pyrrolidine acetic acid, butylamine salt
(35) 1-(p-chlorophenyl)-5-oxo-2-pyrrolidine acetic acid, dibutylamine salt
(36) 1-(3-methoxy-4-chlorophenyl)-5-oxo-2-pyrrolidine acetic acid, trimethylamine salt
(37) 1-ethyl-5-oxo-2-pyrrolidine acetic acid, ethoxyethylamine salt
(38) 1-(n-butyl)-5-oxo-2-pyrrolidine acetic acid, di(ethoxyethyl)amine salt
(39) 1-isopropyl-5-oxo-2-pyrrolidine acetic acid, tris(ethoxyethyl)amine salt
(40) 1-(m-chlorophenyl)-5-oxo-2-pyrrolidine acetic acid, N-ethoxyethyl-N-ethylamine salt
(41) 1-(n-butyl)-5-oxo-2-pyrrolidine acetic acid, N,N-di(methoxyethyl)ethylamine salt
(42) 1-isobutyl-5-oxo-2-pyrrolidine acetic acid, methyl ester
(43) 1-(n-butyl)-5-oxo-2-pyrrolidine acetic acid, methyl ester
(44) 1-phenyl-5-oxo-2-pyrrolidine acetic acid, n-butyl ester
(45) 1-(3-methoxy-4-chlorophenyl)-5-oxo-2-pyrrolidine acetic acid, isobutyl ester
(46) 1-(2-hydroxyethyl)-5-oxo-2-pyrrolidine acetic acid
(47) 1-(2-hydroxypropyl)-5-oxo-2-pyrrolidine acetic acid, sodium salt
(48) 1-(n-butyl)-5-oxo-2-pyrrolidine acetic acid, 2-methoxyethyl ester
(49) 1-isopropyl-5-oxo-2-pyrrolidine acetic acid, 2-hydroxyethyl ester
(50) 1-(n-propyl)-5-oxo-2-pyrrolidine acetic acid, propylene glycol butylether ester
(51) 1-(p-isopropylphenyl)-5-oxo-2-pyrrolidine acetic acid
(52) 1-(sec-butyl)-5-oxo-2-pyrrolidine acetic acid, propylene glycol butylether ester
(53) 1-allyl-5-oxo-2-pyrrolidine acetic acid
(54) 1-(2-propynyl)-5-oxo-2-pyrrolidine acetic acid
(55) 1-(3-methoxypropyl)-5-oxo-2-pyrrolidine acetic acid
(56) 1-(2-cyanoethyl)-5-oxo-2-pyrrolidine acetic acid
(57) 1-(2-carbethoxyethyl)-5-oxo-2-pyrrolidine acetic acid
(58) 1-(2-carboxyethyl)-5-oxo-2-pyrrolidine acetic acid
(59) 1-(2-methoxyethyl)-5-oxo-2-pyrrolidine acetic acid
(60) 1-(2-butynyl)-5-oxo-2-pyrrolidine acetic acid
(61) 1-(3-methoxypropyl)-5-oxo-2-pyrrolidine acetic acid, dimethylamine salt
(62) 1-benzyl-5-oxo-2-pyrrolidine acetic acid
(63) 1-(p-chlorobenzyl)-5-oxo-2-pyrrolidine acetic acid, methyl ester
(64) 1-(p-nitrobenzyl)-5-oxo-2-pyrrolidine acetic acid, dimethylamine salt
(65) 1-(o-methylbenzyl)-5-oxo-2-pyrrolidine acetic acid amide
(66) 1-(3-bromobenzyl)-5-oxo-2-pyrrolidine acetic acid chloride
(67) 1-(p-fluorobenzyl)-5-oxo-2-pyrrolidine acetic acid
(68) 1-(o-butylbenzyl)-5-oxo-2-pyrrolidine acetic acid hydrazide
(69) 1-(p-methoxybenzyl)-5-oxo-2-pyrrolidine acetic acid
(70) 1-(m-butoxybenzyl)-5-oxo-2-pyrrolidine acetic acid
(71) 1-(m-nitrobenzyl)-5-oxo-2-pyrrolidine $\beta,\beta$-dimethylhydrazide
(72) 1-(n-butyl)-5-oxo-2-pyrrolidine acetic acid chloride
(73) 1-(n-butyl)-5-oxo-2-pyrrolidine acetic acid bromide
(74) 1-(n-butyl)-5-oxo-2-pyrrolidine acetic acid fluoride
(75) 1-(n-butyl)-5-oxo-2-pyrrolidine acetic acid amide
(76) 1-(n-butyl)-5-oxo-2-pyrrolidine acetic acid hydrazide
(77) 1-(isoamyl)-5-oxo-2-pyrrolidine acetic acid, $\beta$-methyl hydrazide
(78) 1-(cyclohexyl)-5-oxo-2-pyrrolidine acetic acid, $\beta$-butyl hydrazide
(79) 1-ethyl-5-oxo-2-pyrrolidine acetic acid, $\beta,\beta$-dibutyl hydrazide
(80) 1-octyl-5-oxo-2-pyrrolidine acetic acid
(81) 1-dodecyl-5-oxo-2-pyrrolidine acetic acid
(82) 1-stearyl-5-oxo-2-pyrrolidine acetic acid, dimethylamine salt
(83) 1-cyclopropyl-5-oxo-2-pyrrolidine acetic acid, tert-butyl amide
(84) 1-cyclooctyl-5-oxo-2-pyrrolidine acetic acid, dimethylamide
(85) 1-cyclobutyl-5-oxo-2-pyrrolidine acetic acid
(86) 1-cyclooctyl-5-oxo-2-pyrrolidine acetic acid, di(ethanol)amine salt
(87) 1-cyclobutenyl-5-oxo-2-pyrrolidine acetic acid, N-methyl-N-(n-butyl)amide
(88) 1-phenethyl-5-oxo-2-pyrrolidine acetic acid
(89) 1-(3,4-dichlorobenzyl)-5-oxo-2-pyrrolidine acetamide
(90) 1-(3,4-dichlorophenethyl)-5-oxo-2-pyrrolidine acetic acid, amine salt
(91) 1-(2,5-dimethylphenethyl)-5-oxo-2-pyrrolidine acetic acid
(92) 1-(2,5-dimethoxybenzyl)-5-oxo-2-pyrrolidine acetic acid bromide
(93) 1-(2-nitro-4-methylbenzyl)-5-oxo-2-pyrrolidine acetic acid, N-methyl-N-ethylamide It will be understood from the above that the compounds within the scope of this invention include the corresponding halides, amides, hydrazides, esters and alkali metal (sodium, potassium and lithium) salts and alkaline earth metal (calcium, barium, magnesium and strontium) salts. Also included are ammonium and substituted ammonium salts such as monoalkylammonium, dialkylammonium, trialkylammonium, mono(alkoxyalkyl)ammonium, mono(hydroxyalkyl)ammonium, di(alkoxyalkyl)ammonium, di(hydroxyalkyl)ammonium, tri(alkoxyalkyl)ammonium, tri(hydroxyalkyl)ammonium, mono(alkoxyalkyl)alkylammonium, mono(hydroxyalkyl)alkylammonium, di(alkoxyalkyl)alkylammonium, and di(hydroxyalkyl)alkylammonium, where alkyl and hydroxyalkyl are each less than 5 carbons, and alkoxyalkyl is less than 7 carbons.

Preferred for effectiveness are those compounds having in the 1-position alkyl of 3-5 carbons. Economy and use advantages are obtained when the acid compound itself is used, or such derivatives as the methyl ester, ethyl ester, amide, sodium salt and dialkylammonium salt.

The compounds of this invention have outstanding utility as plant growth retardation agents, without objectionable deleterious effects on the plant. They give excellent retardation of Kentucky bluegrass, creeping red fescue, numerous bentgrass varieties and strains, Kentucky 31 fescue, crabgrass, orchard grass, timothy, Bermuda grass, rye grass, foxtail, Johnson grass, quackgrass, wild oats and a large variety of broadleaf plants, such as mustard, bindweed, zinnia, marigold and numerous leguminous plants. Also, small grains (wheat, barley, oats and rye) show growth retardation.

These compounds show outstandingly effective retardation with an excellent safety factor. Foliage retardation without injury is obtained on annual as well as established perennial plants.

An especially important advantage of this invention is the stimulation of stooling or tillering, i.e., increased number of buds from one stem or root stock on desirable grass and small grain species. Beneficial results from treatment with the present compounds are the retardation of grass growth with reduction in mowings and the creation of a thicker, more desirable turf.

The compounds of this invention can be applied as pre-emergence or post-emergence applications, soil drenches or they can be mixed intimately with the soil. Rates of application will usually be in the range of 0.25 to 16 pounds per acre but, as will be understood, use will be at a rate sufficient to effect plant growth retardation and grass growth retardation.

In the case of turf and roadside grasses, 1 to 8 pounds (active) per acre applied during the growing season retards the growth of foliage and decreases the number of required mowings per season. Further, this treatment increases the tillering of bluegrass, bentgrass, fescues, Johnson grass, and other turf and roadside grasses. This results in a thicker stand of grass and gives a more pleasing appearance to the viewer.

The active retardant composition can be used as such but will generally be formulated with other materials as will be readily understood in the art. Suitable such materials can be of the type disclosed, for example, in Jones U.S. Patent No. 2,412,510 issued December 10, 1946, the entire disclosure of which pertaining to formulating materials is hereby incorporated by reference and is made a part of this disclosure.

Particularly beneficial compositions are those comprised of the following 4 different novel and useful compositions:

(1) From about 25 to 98% by weight of at least one active compound within this invention in admixture with from 3 to 75% by weight of an inert solid powder having an average particle size below about 50 microns in diameter;

(2) From 0.5 to 50% by weight of at least one active compound within this invention in an emulsifiable oil; and (3) From 5 to 90% by weight of at least one active compound of this invention with up to about 15% by weight of a surface-active agent selected from the group consisting of cationic, anionic and non-ionic surface-active agents, and mixtures of these agents.

(4) From 0.25 to 10% by weight of at least one active compound of this invention with a fertilizer material.

The above four compositions can, of course, contain other ingredients of the type referred to above.

The active ingredients can advantageously be used incorporated in or on a material in granular form, such as a fertilizer, attaclay, pellets, and the like. The active retardant chemicals of this invention can, of course, be used with other compatible agricultural chemicals, such as turf and soil fungicides, insecticides, fertilizers, and the like.

In order that the invention will be better understood, the following illustrative examples are given in addition to those set forth above.

Example 1

A plant growth retardant composition is prepared of the following ingredients:

| | Percent |
|---|---|
| 1-(n-butyl)-5-oxo-2-pyrrolidine acetic acid | 25.0 |
| Alkyl naphthalene sulfonic acid, Na salt | 0.5 |
| Sodium lignin sulfonate | 1.0 |
| Attapulgite clay (less than 50 microns average diameter) | 73.5 |

The above components are combined by first blending the surfactants and the clay and then spraying in the liquid, active material while blending. This is followed by micropulverizing to deagglomerate any wet lumps which may have formed, and reblending.

Four to 8 pounds of this formulation is added to 100 gallons of water and applied to ornamentals (for example, cedar, privet, forsythia, and willow) that have reached the desired size. The plants are sprayed to the point of run-off with this spray. The treatment retards new growth and greatly reduces the trimming necessary to maintain these plants at the size desired. One to two such treatments per year maintains the ornamentals at the desired size.

Example 2

A composition of the following ingredients is formulated:

| | Percent |
|---|---|
| 1-cyclohexyl-5-oxo-2-pyrrolidine acetic acid | 50 |
| Methyl Cellosolve | 47 |
| Isooctyl phenyl polyethoxy ethanol | 3 |

The above liquid composition is prepared by simple mixing of the components. Upon dilution to use levels with water all components are soluble.

One to two pounds (active) of this material in 60 gallons of water is sprayed on an acre of timothy-bluegrass-fescue mixture before flower primodia are visible (when the crop is 5–8 inches tall). This treatment effectively retards maturation and results in the production of more vegetative growth.

Example 3

The following ingredients are formulated:

| | Percent |
|---|---|
| 1-(n-butyl)-5-oxo-2-pyrrolidine acetic acid, dimethylamine salt | 4 |
| 15–30 mesh granular "Attaclay" | 96 |

This product is prepared by spraying a concentrated aqueous solution of the active material upon granular "Attaclay" while tumbling the latter, then drying.

One hundred pounds per acre of the granular formulation is applied to bluegrass turf with a lawn spreader prior to the emergence of crabgrass. Growth of crabgrass is retarded markedly. Creeping red fescue, Kentucky 31 fescue, bentgrass, and bluegrass also show excellent retardation of foliage growth by this treatment. This reduces the number of required mowings during the growing season.

Example 4

Example 3 is repeated, substituting a like amount of commercial fertilizer for the attaclay, with similar excellent results.

Example 5

The following composition is prepared:

| | Percent |
|---|---|
| 1-(n-butyl)-5-oxo-2-pyrrolidine acetic acid, methyl ester | 25 |
| Polyoxyethylene sorbitan mono ester of tall oil acids | 5 |
| Xylene | 70 |

This emulsifiable oil formulation is mixed with 100 gallons of water per acre and applied at the rate of 2 to 6 pounds per acre with a truck-mounted sprayer to newly-mowed grass growing along a roadside. From 30 to 70% growth retardation of the grasses (Johnson grass, Bermuda grass, ryegrass, crabgrass, foxtail, millet, Kentucky 31 fescue, timothy, and bluegrass) is noted and the number of mowings per season is markedly reduced.

Example 6

The following components are formulated:

| | Percent |
|---|---|
| 1-(n-butyl)-5-oxo-2-pyrrolidine acetic acid, sodium salt | 35 |
| Polyoxyethylene lauryl ether | 3 |
| Synthetic fine silica | 62 |

The surfactant is first mixed with the liquid active material then this mixture is sprayed upon the silica while blending. This is followed by micropulverizing and reblending to assure uniform distribution.

One-quarter to one gram of this material is first mixed with 50 grams of fine sand, then this sand-chemical mixture is thoroughly dispersed in a cubic foot of greenhouse potting soil. Marigold, zinnia and petunia are planted in this mix. The plants grown in this treated soil have shorter stems and are more desirable for potted plants.

*Example 7*

A formulation of 1-(n-butyl)-5-oxo-2-pyrrolidine acetic acid, dimethylamine salt, on "Attaclay" is prepared as an 80% by weight salt—20% "Attaclay" mix and then applied onto infestations of quackgrass, crabgrass, and bluegrass at rates of 4 to 8 pounds of active ingredient per acre in 80 gallons of water per acre. Excellent growth retardation is obtained. Similar excellent results are obtained on infestations of ryegrass and Bermuda grass.

*Example 8*

1-(n-butyl)-5-oxo-2-pyrrolidine acetic acid, dimethylamine salt, is applied at the rate of 0.5 to 2 pounds per acre dissolved in 60 gallons of water to young wheat plants (5 weeks after seeding or in late winter or early spring when vigorous growth begins). Within 3 to 4 weeks after treatment, the wheat plants show exceptional tillering as compared to untreated plants. Similar results are obtained on barley, oats and rye.

*Example 9*

The following composition (percents are by weight) is prepared by simple admixture:

| | Percent |
|---|---|
| 1-(n-butyl)-5-oxo-2-pyrrolidine acetic acid, dimethylamine salt | 25 |
| Dioctyl sodium sulfosuccinate | 5 |
| Water | 70 |

Four pounds of this formulation diluted with 100 gallons of water is sprayed on an acre of young oat plants. After 2 to 4 weeks, the oat plants exhibit outstanding tillering compared with untreated oat plants of the same age.

The preceding examples can readily be repeated by substituting other appropriate compounds within the scope of this invention for those having similar physical properties illustrated in the above examples.

*Examples 10–24*

For example, the following compounds can be substituted for the active component of Example 5 above, with similar excellent results:

| Example | Compound |
|---|---|
| 10 | 1-phenyl-5-oxo-2-pyrrolidine acetic acid. |
| 11 | 1-(n-butyl)-5-oxo-2-pyrrolidine acetic acid, isopropyl ester. |
| 12 | 1-(p-chlorophenyl)-5-oxo-2-pyrrolidine acetic acid. |
| 13 | 1-(p-methoxyphenyl)-5-oxo-2-pyrrolidine acetic acid. |
| 14 | 1-(3-methoxy-4-chlorophenyl)-5-oxo-2-pyrrolidine acetic acid. |
| 15 | 1-isopropyl-5-oxo-2-pyrrolidine acetic acid. |
| 16 | 1-(t-butyl)-5-oxo-2-pyrrolidine acetic acid. |
| 17 | 1-(n-hexyl)-5-oxo-2-pyrrolidine acetic acid. |
| 18 | 1-(m-chlorophenyl)-5-oxo-2-pyrrolidine acetic acid. |
| 19 | 1-(2-chloro-5-nitrophenyl)-5-oxo-2-pyrrolidine acetic acid. |
| 20 | 1-(m-bromophenyl)-5-oxo-2-pyrrolidine acetic acid. |
| 21 | 1-(p-tolyl)-5-oxo-2-pyrrolidine acetic acid. |
| 22 | 1-(2,5-dimethoxyphenyl)-5-oxo-2-pyrrolidine acetic acid. |
| 23 | 1-(p-ethylphenyl)-5-oxo-2-pyrrolidine acetic acid, butyl ester. |
| 24 | 1-(p-chlorophenyl)-5-oxo-2-pyrrolidine acetic acid, isobutyl ester. |

By way of further examples, the following compound can be formulated and used as in Example 1 with similar excellent results as in that example.

| Example | Compound |
|---|---|
| 25 | 1-(n-propyl)-5-oxo-2-pyrrolidine acetic acid. |

Similarly, the following exemplified compounds can be formulated and used as in Examples 3 and 7 with the excellent results as in those examples.

| Example | Compound |
|---|---|
| 26 | 1-ethyl-5-oxo-2-pyrrolidine acetic acid, ammonium salt. |
| 27 | 1-phenyl-5-oxo-2-pyrrolidine acetic acid, sodium salt. |
| 28 | 1-(sec-butyl)-5-oxo-2-pyrrolidine acetic acid, potassium salt. |
| 29 | 1-(p-tolyl)-5-oxo-2-pyrrolidine acetic acid, butylamine salt. |
| 30 | 1-isobutyl-5-oxo-2-pyrrolidine acetic acid, calcium salt. |
| 31 | 1-(2-methoxy-3-chloro-5-nitrophenyl)-5-oxo-2-pyrrolidine acetic acid, barium salt. |
| 32 | 1-(n-amyl)-5-oxo-2-pyrrolidine acetic acid, triethylamine salt. |
| 33 | 1-(3,4-dichlorophenyl)-5-oxo-2-pyrrolidine acetic acid, ethoxyethylamine salt. |
| 34 | 1-(m-nitrophenyl)-5-oxo-2-pyrrolidine acetic acid, tris(butoxyethyl)amine salt. |
| 35 | 1-(p-fluorophenyl)-5-oxo-2-pyrrolidine acetic acid, N-methoxyethyl-N, N-di-methylamine salt. |
| 36 | 1-isopropyl-5-oxo-2-pyrrolidine acetic acid, N-methoxypropyl-N-butylamine salt. |
| 37 | 1-(n-butyl)-5-oxo-2-pyrrolidine acetic acid amide, 30.0% alkyl naphthalene sulfonic acid, Na salt, 0.5%, sodium lignin sulfonate, 5.0%, attapulgite clay (less than 50 microns average diameter), 64.5%. |

The above components are combined by dry blending and are then pulverized and reblended.

The above formulation is used for the treatment of small grain seed to produce a shorter, stronger straw. Wheat, oats, and barley seed are treated with the above formulation at the rate of ½ to 1 oz. per bushel of seed. Following planting, germination, and growth, the small grains have a shorter, stronger straw which reduces lodging (blow down) in the field.

| Example | Compound |
|---|---|
| 38 | 1-(n-octyl)-5-oxo-2-pyrrolidine acetic acid, 35% isophorone, 58% polyoxyethylene ethers and oil soluble sulfonates, 7% |

The above ingredients are mutually soluble. On mixing with water, an emulsion is obtained.

This compound is used for controlling sucker growth (retardation of auxiliary growth) on topped tobacco plants (flue-cured, burley, shade grown, and cigar wrapper types). The above formulation is applied at the rate of 1½ to 3 pounds (active ingredient) in 25 to 35 gallons water per acre to flue-cured tobacco, applied at or near the topping stage. This treatment gives satisfactory control of suckers during the harvesting period.

It will be readily understood by persons skilled in the art from a reading of the above exemplary disclosure that other products within the scope of this invention can be prepared and used in accordance with the teachings herein by simple substitution of appropriate materials, including active compounds mentioned hereinbefore, in the above examples which are given for purposes of illustration only. This application is a continuation-in-part of my copending application Serial No. 120,907, filed June 30, 1961, and now abandoned.

The invention claimed is:

The method of retarding the growth of vegetation comprising applying to the area of vegetation growth, in an amount sufficient to retard the growth of said vegetation, a compound selected from the group consisting of 1-substituted-5-oxo-2-pyrrolidine acetic acids, and halides, salts, unsubstituted amide, hydrazides and lower alkyl esters of said acids, said salts being selected from the group consisting of alkali metal, alkaline earth metal, ammonium, alkylammonium, alkoxyalkylammonium, hydroxyalkylammonium, (alkoxyalkyl) - alkylammonium, and (hydroxyalkyl)alkylammonium where said alkyl has 1 through 4 carbon atoms, said hydroxyalkyl has 1 through 4 carbon atoms, and said alkoxyalkyl has 1 through 6 carbon atoms; and wherein said substituent is a radical selected from the group consisting of alkyl of 2 through 18 carbons, cycloalkyl of 3 through 8 carbons, alkenyl, alkynyl, hydroxyalkyl, alkoxyalkyl, cyanoalkyl, carboxyalkyl, carbalkoxyalkyl, and with each of these latter radicals having from 2 through 6 carbon atoms; phenyl; and mono-substituted and di-substituted phenyl; phenylalkyl wherein the alkyl group has less than 3 carbons; and mono-substituted and di-substituted phenylalkyl having the alkyl of less than 3 carbons; wherein said substituent is on the phenyl ring and is selected from the group consisting of halogen, methyl, ethyl, isopropyl, methoxy, nitro, and combinations of these.

References Cited in the file of this patent

UNITED STATES PATENTS

| | | |
|---|---|---|
| 2,496,163 | Jacobson | Jan. 31, 1950 |
| 2,578,526 | Evans | Dec. 11, 1961 |
| 2,984,673 | Bortnick et al. | May 16, 1961 |
| 3,079,399 | Exner | Feb. 26, 1963 |